United States Patent [19]
Kelly

[11] 3,811,191
[45] May 21, 1974

[54] ELASTIC SCALE INSTRUMENT
[76] Inventor: Michael J. Kelly, P.O. Box 36195, Cincinnati, Ohio 45236
[22] Filed: Jan. 22, 1973
[21] Appl. No.: 325,314

[52] U.S. Cl............................. 33/137 L, 33/107 R
[51] Int. Cl. .............................................. G01b 3/08
[58] Field of Search....................................... 33/137

[56] References Cited
UNITED STATES PATENTS
2,512,184  6/1950  Soydam............................ 33/137 L
1,432,834  10/1922  Buck.................................... 33/161
1,958,024  5/1934  Stowell............................ 33/143 M
3,254,414  6/1966  Puthuff............................ 33/137 L FOREIGN PATENTS OR APPLICATIONS
104,952  9/1974  France ............................. 33/137 L Primary Examiner—Harry N. Haroian
Attorney, Agent, or Firm—John W. Melville; Albert Strasser; Stanley H. Foster

[57] ABSTRACT

An elastic scale instrument for dividing the distance between two points on an object into a desired number of equal length subdivisions. The instrument comprises an elongated base capable of being placed along the object with its long axis in parallel relationship to a straight line between the above mentioned two points. An elongated slide is slidably mounted on the base and is shiftable axially and longitudinally of the base long axis between a retracted position and an extended position with respect to the base. An elastic scale is affixed at one end to a mounting post on the base and at its other end to a mounting post on the slide and is adapted to lie along the straight line between the above mentioned two points. Indicia marks are equally spaced along the elastic scale. The elastic scale is stretchable between a normal condition when the slide is in its retracted position and a fully stretched condition when the slide is in its extended position. Means are provided to lock the slide with respect to the base at any desired condition of the elastic scale between and including its normal and fully stretched conditions.

8 Claims, 8 Drawing Figures

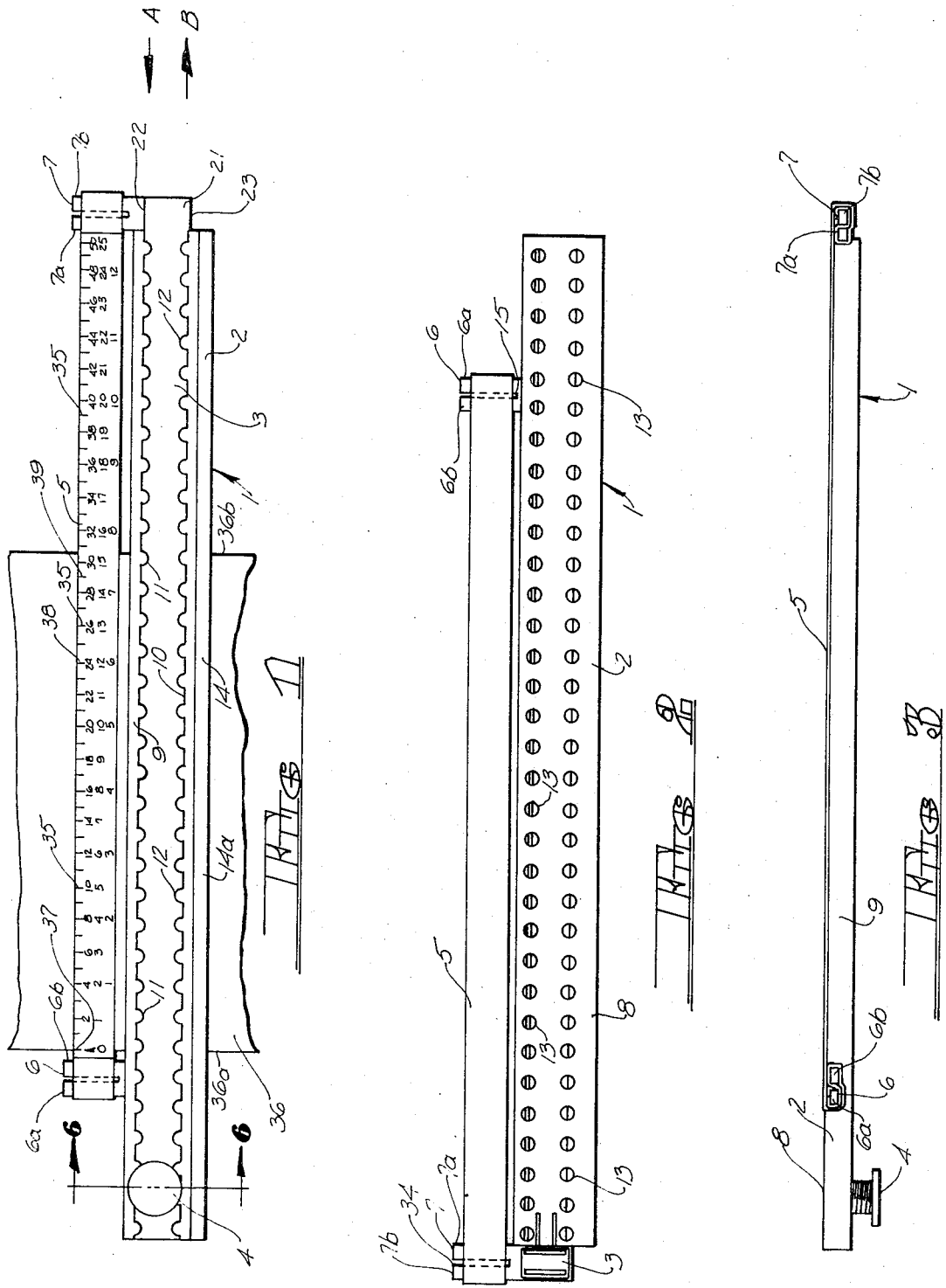

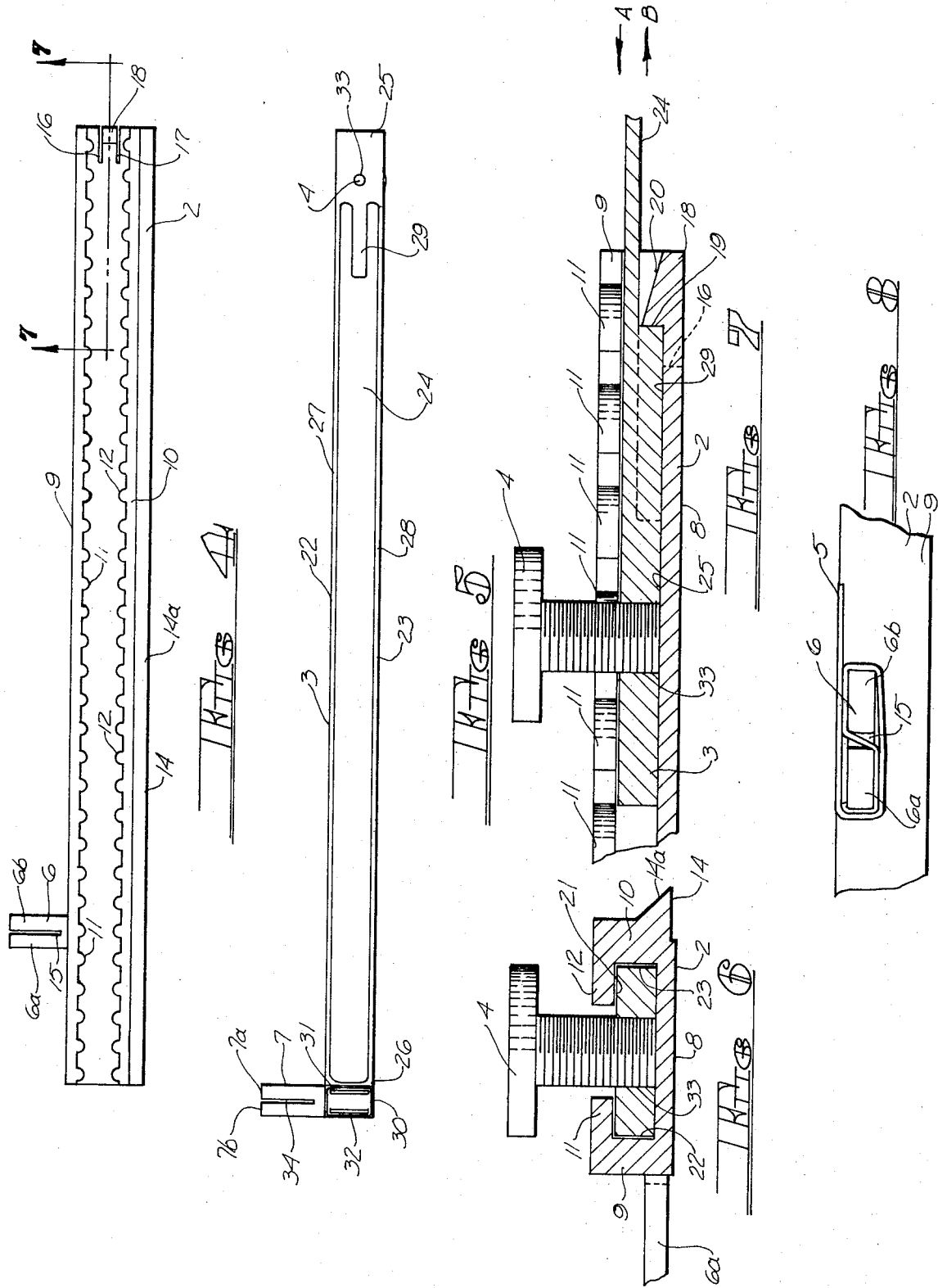

ELASTIC SCALE INSTRUMENT

BACKGROUND OF THE INVENTION

1. Field of the Invention

The invention relates to an elastic scale instrument, and more particularly to an instrument for dividing the distance between two points on an object into a desired number of equal length subdivisions.

2. Description of the Prior Art

Heretofore, prior art workers have devised a number of different instruments utilizing an elastic scale adapted to yield various types of information. These prior art instruments, however, have generally been characterized by the fact that the elastic scale is mounted on support means which are cumbersome, difficult to manipulate and frequently expensive to manufacture. U.S. Pat. No. 3,254,414 and 2,388,303 are illustrative of prior art instruments wherein the elastic scale is mounted on adjustable bracket means. In other instances, the elastic scale is affixed at its ends to base-mounted post means, one or both of the post means being adjustable longitudinally of the supporting base. As a consequence, the supporting base must at all times be as long or longer than the maximum stretched condition attainable by the elastic scale. U.S. Pat. 102,621; 3,213,544 and 3,269,018 are exemplary of such structures. In yet other embodiments, the supporting base for the elastic scale is foldable or includes reel type mechanism for the elastic scale. U.S. Pat. Nos. 3,475,824 and 101,411 are exemplary, respectively, of such embodiments.

The prevent invention is addressed to an elastic scale instrument which is simple in design, inexpensive to manufacture and easy to assemble. The instrument is compact, easy to manipulate and simple to use. Unlike most prior art structures, the instrument may be laid flat upon the object having the two points with which the elastic scale is to be used. The instrument of the present invention comprises, in addition to the elastic scale, only three parts which lend themselves well to be molded of plastic or the like.

As will be developed hereinafter, the elastic scale instrument of the present invention may have a number of different applications. The indicia on the elastic scale may be varied, depending upon the information the instrument is desired to yield. While not intended to be so limited, for purposes of an exemplary showing, the elastic scale instrument will be described in its application as a means for dividing the distance between two points on an object into a desired number of equal length subdivisions.

SUMMARY OF THE INVENTION

The elastic scale instrument comprises a body, a slide, a locking means and an elastic scale. The body is an elongated rectangular member having a flat rearward surface capable of being placed on the object, a length of which is desired to be subdivided. The body has a generally C-shaped or channel shaped cross section.

The slide comprises an elongated rectangular member, the cross sectional configuration of which is such as to just nicely be received in the channel-shaped base. The slide is shiftable with respect to the base and along the long axis of the base between a retracted position wherein substantially all of the slide is located within the base and an extended position wherein a preponderance of the length of the slide extends beyond one end of the base.

The elastic scale is affixed at one end to a mounting post on the base. At its other end, the elastic scale is affixed to a mounting post on the slide. The elastic scale is stretchable between a normal or relaxed condition when the slide is in its retracted position and a fully stretched condition when the slide is in its extended position. The elastic scale may have any appropriate indicia markings spaced equally from each other along its length.

A locking means is provided to lock the slide with respect to the base at any position of the slide including and between its retracted and extended positions. Thus, the locking means will enable the maintaining of the elastic scale at any condition of stretch between and including its normal position and its fully stretched position. The locking means may take any suitable form and in the embodiment described comprises a simple hold-down screw.

BRIEF DESCRIPTION OF THE DRAWINGS

FIG. 1 is a front elevational view of the elastic scale instrument of the present invention.

FIG. 2 is a rear elevational view of the elastic scale instrument.

FIG. 3 is a top view of the elastic scale instrument.

FIG. 4 is a front elevational view of the base.

FIG. 5 is a rear elevational view of the slide.

FIG. 6 is a fragmentary cross sectional view taken along the section line 6—6 of FIG. 1.

FIG. 7 is a fragmentary cross sectional view of the base, taken along section line 7—7 of FIG. 4, and illustrating the slide in its fully extended position.

FIG. 8 is a fragmentary top view illustrating the manner in which the elastic scale is affixed to the mounting post on the base.

DESCRIPTION OF THE PREFERRED EMBODIMENTS

Referring first to FIGS. 1 through 3, the instrument of the present invention is generally designated by index numeral 1. The instrument comprises a base 2, a slide 3, a locking screw 4 and an elastic scale 5. The elastic scale 5 is affixed at one end to a mounting post 6 on the base 1 and at the other end to a mounting post 7 on the slide 3.

The base 2 is most clearly shown in FIGS. 1 through 4 and 6. The base comprises an elongated rectangular member having a flat rear or bottom surface 8. This enables the instrument to be placed flat along the object, a length of which is to be subdivided. As is most clearly shown in FIG. 6, the base has a pair of upstanding walls 9 and 10 along its longitudinal edges. The walls 9 and 10, in turn, have a plurality of inwardly extending, substantially semicircular lugs 11 and 12, respectively. The bottom or back 8, walls 9 and 10 and lugs 11 and 12 provide the base 2 with a C-shaped or channel-shaped cross section (again as most clearly shown in FIG. 6).

It will be understood that the lugs 11 and 12 on the walls 9 and 10 could constitute single, continuous, longitudinal lugs or ridges along the inside surfaces of their respective walls. The individual lugs 11 and 12 are used for purposes of a decorative appearance and ease of molding. Again for ease of molding purposes, the rear or bottom surface 8 may have a plurality of perforations 13 lying opposite the lugs 11 and 12 to assist in their formation during the molding process.

The base may optionally be provided with a longitudinal extension 14 along its wall portion 10. The bottom surface of the extension 14 is parallel to but slightly raised from the rear or bottom surface 8 of the base. The other surface 14a of the extension 14 slopes outwardly and downwardly as shown in FIG. 6. The extension 14 may serve as a straight edge portion of the instrument and may, if desired, be provided with a ruled scale or the like (not shown) along its surface 14a. *The raised bottom surface of the extension 14 will prevent the spreading of ink thereunder if used with an ink pen or the like.*

Near its left hand end (as viewed in FIGS. 1, 3 and 4) the wall portion 9 is provided with the laterally extending mounting post 6. The mounting post 6 may be an integral, one-piece portion of the base 2. The mounting post has a longitudinal slot 15 extending centrally thereof. The slot 15 divides the mounting post 6 into bifurcations 6a and 6b. The purpose of bifurcations 6a and 6b will be described hereinafter.

The right hand end of the base 2 (as viewed in FIG. 4) is provided with a pair of longitudinal slots 16 and 17 defining a resilient latch 18. As will be evident from FIG. 7, the latch 18 has a first surface 19 perpendicular to the rear or bottom 8 and a sloping surface 20. The purpose of the latch 8 will be described hereinafter.

The slide 3 is most clearly shown in FIGS. 1 and 5. The slide 3 comprises an elongated rectangular member having a planar upper or forward surface 21 and longitudinal edges 22 and 23.

FIG. 5 illustrates the rear surface of the slide. The rear surface has a central depressed portion 24 surrounded by end portions 25 and 26 and longitudinal edge portions 27 and 28. The end and edge portions 25 through 28 are coplanar. The end portion 25 has a coplanar extension 29 extending centrally of and into the depressed portion 24. The end portion 26 has a lug 30 with ridges 31 and 32 formed thereon. The purposes of extension 29, lug 30 and ridges 31 and 32 will be described hereinafter.

As is shown in FIGS. 6 and 7, the slide 3 is intended to be mounted in the C-shaped or channel-shaped base 2 and to be of such cross sectional dimensions as to just nicely fit therein with the slide edges 22 and 23 lying adjacent the base walls 9 and 10, respectively. The coplanar rear surfaces 25 through 28 of the slide lie adjacent the inside surface of the rear or bottom 8 of the base. The base member lugs 11 and 12 overlie the front or top surface 21 of the slide.

The slide 3 is intended to be longitudinally shiftable with respect to the base 2. In assembly, the slide may be inserted in the channel-shaped base 2 from the right hand end as viewed in FIGS. 1 and 3 or the left hand end as viewed in FIG. 2. When the slide 3 is fully inserted in the base 2 (a position hereinafter called its retracted position), it is prevented from passing further through the base member by virtue of an abutting relationship between the mounting post 7 on the slide and the adjacent end of the base 2. This is illustrated in FIG. 2.

During assembly of the instrument, the slide 3 is inserted in the base 2 in the direction of arrow A in FIGS. 1 and 7. The end of the slide will cooperate with the sloping surface 20 of the latch 18 to depress the latch and enable insertion of the slide in the base. Once inserted, the latch 18 will return to its normal position shown in FIG. 7 and the depressed central portion 24 in the rear surface of the slide will accommodate the latch. The slide is intended to be extended from the base in the direction of arrow B in FIGS. 1 and 7. Removal of the slide from the base in the direction of arrow B will be prevented by and the extended most position of the slide with respect to the base will be determined by the abutment of the surface 19 on latch 18 and the extension 29 formed on the rear side of the slide. This is illustrated in FIG. 7, wherein the slide 3 is shown in its extended most position.

That end of the slide which always remains within the base 2 is provided with a locking means so that the slide may be held at any desired position with respect to the base between and including its retracted and extended positions. Any appropriate latching means may be employed. For purposes of an exemplary showing, the slide is illustrated in FIGS. 6 and 7 as having a threaded perforation 33 formed therein adapted to receive the locking screw 4. In FIGS. 6 and 7 the locking screw is shown in its normal position wherein the slide is free to shift within the base. However, as will be evident from these figures, if the screw is turned inwardly against the inside surface of the rear or bottom 8 of the base, the upper or forward surface of the slide, adjacent the screw, will be forced against the adjacent ones of the base lugs 11 and 12. This results in a wedging or locking action between the slide and the base. The free end of the slide (the right end in FIG. 1, or the left end in FIG. 5) is provided with a laterally extended mounting post 7, similar to the mounting post 6 on base 2. Again, as in the case of mounting post 6, the post 7 is provided with a central slot 34 dividing it into bifurcations 7a and 7b. The purpose of bifurcations 7a and 7b will be described hereinafter.

The lug 30 and its ridges 31 and 32, on the same end of the slide, are so sized that the ridges 31 and 32 are substantially coplanar with the rear or bottom surface 8 of the base 2. This means that when the base 2 is placed upon an object, a length of which is to be subdivided, the end of the slide beyond the base will also rest on the object without having to bend the slide. This is true when the slide is in its retracted or extended positions, or any position therebetween.

The elastic scale 5 may be made of any appropriate stretchable and flexible material characterized by uniform stretching throughout its length when pulled at its ends. While not so limited, excellent results have been achieved when the elastic scale has been made of a homogeneous material such as pure gum rubber. A pure gum rubber scale of constant width and thickness displays the desired uniform stretching characteristics.

The elastic scale 5 is affixed at its ends to the mounting post 6 of the base 2 and the mounting post 7 of the slide 3. While it is within the scope of the invention to provide non-slotted mounting posts and to affix the elastic scale to them in any appropriate manner such as gluing or the like, FIG. 8 shows an exemplary attachment of one end of the elastic scale to the mounting post 6 which requires no glue or other attachment means and which has performed completely satisfactorily.

In FIG. 8, the base mounting post 6 is shown. As illustrated, the end of the elastic scale is partially wrapped about the mounting post bifurcation 6a; is brought through the slot 15 and wrapped about the bifurcation 6b; and is thereafter brought again about the bifurcation 6a, extending behind both bifurcations 6a and 6b. By virtue of this simple wrapping procedure and the frictional characteristic of the elastic band itself, the band is firmly anchored to the mounting post 6. This mounting may be accomplished quickly and easily without the requirement of glue, mechanical attachment means or the like. It will be understood that the other end of the elastic scale may be similarly affixed to the mounting post 7 of the slide 3.

It will be noted from FIGS. 3, 6 and 8 that the mounting posts are inset considerably from the top or forward surface of the base 2, and are inset only slightly with respect to the rear surface 8 of the base. This accomplishes two purposes. First of all, the rear surface of the elastic scale will be substantially coplanar with the rear surface 8 of the base so that when the base is rested upon an object, a length of which is to be subdivided, the elastic scale will be adjacent to or will rest upon the object as well. Furthermore, when the elastic scale is in a stretched condition, should it produce any bowing in the base 2 and slide 3, the bowing will be such that the left hand most end of the base and the right hand most end of the slide (as viewed in FIG. 1) will rest upon the object and the midportion of the combined base and slide structure will raise upwardly from the object. A simple application of pressure on the midportion of the object will remove the bow and will assure that the instrument is properly resting upon the object.

As indicated above, the exemplary embodiment described and shown is intended for use as a means for dividing a given length on an object or a distance between two points thereon into a desired number of equal length subdivisions. To this end, the elastic scale is provided with a plurality of equally spaced indicia markings 35 aong the length thereof. The space between each adjacent pair of markings is the same, but may be arbitrarily chosen. For purposes of convenience, the markings are designated in powers of 2. This sort of marking is advantageous because the purpose of the instrument can be accomplished with minimal stretching of the elastic scale 5, the scale never having to be stretched more than twice its normal length.

The use of the instrument may be described as follows. In FIG. 1, the instrument is shown resting upon a piece of paper fragmentarily indicated at 36. Let it be supposed that it is desired to divide the paper 36 widthwise into eight equal segments. Thus, in this instance, the width of the paper becomes the length to be subdivided, or putting it another way, the side edges 36a and 36b of the paper, adjacent the elastic scale 5 constitute the points, the distance between which is sought to be subdivided.

To accomplish the subdivision, the zero mark of the scale indicated at 37 is located at the side edge 36a of the paper. The slide is then moved in the direction of arrow B until the nearest number on the scale constituting a multiple of 8 lies upon the edge 36b of the paper. In this instance, the nearest such number on the scale would be the 24 mark indicated by index numeral 38. When the indicia mark 24 has been brought in line with the edge 36b of the paper 36, it may found that the zero mark of the scale, will have shifted slightly inwardly of the paper edge 36a. The zero mark is then brought back into alignment with the paper edge 36a and an adjustment is made between the paper edge 36b and the 24 scale mark. Depending upon the amount by which the elastic scale is stretched, such an adjustment may be required to be made more than once. After this adjustment, the locking screw 4 is tightened to clamp the slide 3 in position in the base 2, thus holding the elastic scale 5 in position. If a mark is then put on the paper 36 at every third scale mark, the paper 36 will have been divided into eight equal widthwise subdivisions. If the paper 36 were to be divided widthwise into 29 equal spaces, it would only be necessary to stretch the elastic scale until the indicia mark indicated at 39 was in alignment with the paper edge 36b (the above noted one or more adjustments in the zero mark having been made). Then, a mark on the paper should be made adjacent each indicia mark on the elastic scale. The paper would thereby be rapidly and easily divided into 29 widthwise subdivisions.

Modifications may be made in the invention without departing from the spirit of it. The instrument of the present invention may constitute an invaluable tool for artists, architechts, engineers, draftsmen, educators, students, hobbyists, office workers and the like. It may serve as a drafting instrument, a measuring means, a navigation aid or the like. The elastic scale 5 may be provided with any suitable type of indicia markings. For example, depending upon the use to which the instrument is put and the information sought to be derived from it, the scale may be divided into time, distance, percent of length or the like.

The embodiments of the invention in which an exclusive property or privilege is claimed are defined as follows:

1. An elastic scale instrument for dividing the distance between two points on an object into a predetermined number of equal length subdivisions, said instrument comprising an elongated base having first and second ends and having a flat bottom adapted to be placed on said object with the long axis of said base parallel to a straight line between said points, said base having a C-shaped cross section, a slide comprising an elongated member with first and second ends corresponding to said first and second ends of said base, said slide being slidably and captively mounted in said C-shaped base and being axially shiftable therein from a retracted position wherein all but said second end of said slide is within said C-shaped base and an extended position wherein all but said first end of said slide extends beyond said second end of said base, means to determine said retracted and extended positions of said slide and to prevent removal of said slide from both said first and second ends of said base, an elastic scale, indicia markings equally spaced along the length of said elastic scale, a mounting post on said base inset from said first end thereof to which one end of said elastic scale is affixed, a mounting post at said second end of said slide scale to which the other end of said scale is affixed, said base mounting post extending laterally from one longitudinal edge of said base and in a plane parallel to said base bottom, said slide mounting post extending laterally from the corresponding longitudinal edge of said slide and being substantially coplanar with said base mounting post, said elastic scale being held by said mounting posts parallel to the long axis of said base and slide, said elastic scale being uniformly stretchable throughout its length between a normal condition when said slide is in said retracted position and a fully stretched condition when said slide is in said extended position and said elastic scale is stretched substantially twice the length of its normal condition and means to lock said slide with respect to said base at any position of said slide between and including said retracted and extended positions.

2. The structure claimed in claim 1 wherein said base has a straight edge along one longitudinal edge thereof.

3. The structure claimed in claim 1 wherein said indicia markings on said elastic scale are arranged in powers of 2.

4. The structure claimed in claim 1 wherein means to lock said slide with respect to said base comprises a locking screw threadedly engaged in a perforation extending through said slide, said locking screw being turnable between an unlocked position wherein said slide is shiftable within said base and a locked position wherein said screw engages said base and prevents shifting of said slide therein.

5. The structure claimed in claim 1 including means on the rear surface of said second end of said slide to render said rear surface of said second slide end coplanar with said rear surface of said base.

6. The structure claimed in claim 1 wherein said base and slide mounting posts are bifurcated, each of said elastic scale ends being frictionally affixed to its respective mounting post by being wrapped about and between said bifurcations thereof.

7. The structure claimed in claim 1 wherein said indicia markings on said elastic scale are arranged in powers of 2.

8. The structure claimed in claim 1 wherein said means preventing removal of said slide from said first end of base comprises said slide mounting post, said slide mounting post being in abutment with said second end of said base when said slide is in said retracted position, said means preventing removal of said slide from said second end of said base comprising a resilient latch at said second end of said base and an extension on the rear side of said slide at said first end thereof, said latch and extension being in abutting relationship when said slide is in said extended position.

* * * * *